United States Patent
Hegenbart et al.

(10) Patent No.: US 10,479,048 B2
(45) Date of Patent: Nov. 19, 2019

(54) BONDING ARRANGEMENT AND PRODUCTION METHOD

(71) Applicant: Airbus Operations GmbH, Hamburg (DE)

(72) Inventors: Matthias Hegenbart, Hamburg (DE); Hermann Benthien, Hamburg (DE); Mika Bots, Hamburg (DE)

(73) Assignee: Airbus Operations GmbH (DE)

( * ) Notice: Subject to any disclaimer, the term of this patent is extended or adjusted under 35 U.S.C. 154(b) by 65 days.

(21) Appl. No.: 15/706,919

(22) Filed: Sep. 18, 2017

(65) Prior Publication Data
US 2018/0079171 A1    Mar. 22, 2018

(30) Foreign Application Priority Data
Sep. 21, 2016   (EP) ..................... 16189841

(51) Int. Cl.
*B32B 7/02*   (2019.01)
*B32B 7/12*   (2006.01)
(Continued)

(52) U.S. Cl.
CPC ............ *B32B 7/02* (2013.01); *B32B 1/04* (2013.01); *B32B 3/00* (2013.01); *B32B 3/02* (2013.01);
(Continued)

(58) Field of Classification Search
CPC .. B32B 7/02; B32B 7/05; B32B 25/00; B32B 15/20; B32B 15/08; B32B 15/046;
(Continued)

(56) References Cited

U.S. PATENT DOCUMENTS 5,496,982 A * 3/1996 Tsai ..................... H01H 13/705
                                                    200/345
6,558,222 B1   5/2003 Maddock
(Continued)

FOREIGN PATENT DOCUMENTS

DE   20 2007 008330 U1   9/2007
EP       2 415 601 A2    2/2012
(Continued)

OTHER PUBLICATIONS

[NPL-1] "regular"definition according to Dictionary.com; <https://www.dictionary.com/browse/regular>. (Year: 2019).*
(Continued)

*Primary Examiner* — David Sample
*Assistant Examiner* — Donald M Flores, Jr.
(74) *Attorney, Agent, or Firm* — Lerner, David, Littenberg, Krumholz & Mentlik, LLP

(57) ABSTRACT

In order to provide a new and improved bonding arrangement, especially for use in an aircraft or spacecraft, which is designed to overcome problems of bonding arrangements under Mode I loading stress and which is designed or configured particularly to create a bond design which is incapable of locally loading the adhesive bond above the peel strength, a bonding arrangement is disclosed with a coating structure, which is split into a plurality of neighboring structural elements spatially separated from each other, and at least one supporting member is provided, which comprises a plurality of recesses receiving the structural elements in operating position.

20 Claims, 3 Drawing Sheets

(51) Int. Cl.
| | |
|---|---|
| B32B 37/12 | (2006.01) |
| B32B 37/14 | (2006.01) |
| B32B 3/12 | (2006.01) |
| B32B 3/30 | (2006.01) |
| B32B 5/18 | (2006.01) |
| B32B 7/04 | (2019.01) |
| B32B 7/14 | (2006.01) |
| B32B 15/00 | (2006.01) |
| B32B 15/04 | (2006.01) |
| B32B 15/08 | (2006.01) |
| B32B 15/20 | (2006.01) |
| B32B 25/00 | (2006.01) |
| B32B 25/14 | (2006.01) |
| B32B 1/04 | (2006.01) |
| B32B 3/00 | (2006.01) |
| B32B 3/02 | (2006.01) |
| B32B 3/06 | (2006.01) |
| B32B 3/22 | (2006.01) |
| B32B 3/26 | (2006.01) |
| B32B 3/28 | (2006.01) |
| B32B 7/05 | (2019.01) |
| F16B 11/00 | (2006.01) |

(52) U.S. Cl.
CPC ................ *B32B 3/06* (2013.01); *B32B 3/12* (2013.01); *B32B 3/22* (2013.01); *B32B 3/26* (2013.01); *B32B 3/28* (2013.01); *B32B 3/30* (2013.01); *B32B 5/18* (2013.01); *B32B 7/04* (2013.01); *B32B 7/05* (2019.01); *B32B 7/12* (2013.01); *B32B 7/14* (2013.01); *B32B 15/00* (2013.01); *B32B 15/046* (2013.01); *B32B 15/08* (2013.01); *B32B 15/20* (2013.01); *B32B 25/00* (2013.01); *B32B 25/14* (2013.01); *B32B 37/1292* (2013.01); *B32B 37/144* (2013.01); *F16B 11/006* (2013.01); *B32B 2255/205* (2013.01); *B32B 2255/26* (2013.01); *B32B 2255/28* (2013.01); *B32B 2605/00* (2013.01); *B32B 2605/18* (2013.01)

(58) Field of Classification Search
CPC .. B32B 15/00; B32B 7/14; B32B 7/04; B32B 5/18; B32B 37/144; B32B 3/30; B32B 1/04; B32B 25/14; B32B 37/1292; B32B 3/02; B32B 3/06; B32B 3/22; B32B 3/26; B32B 3/12; B32B 3/00; B32B 3/28; B32B 7/12; B32B 2605/00; B32B 2255/28; B32B 2255/26; B32B 2255/205; B32B 2605/18; F16B 11/00
See application file for complete search history.

(56) References Cited

U.S. PATENT DOCUMENTS

| | | |
|---|---|---|
| 2013/0087273 A1 | 4/2013 | Stehmeier et al. |
| 2014/0220854 A1 | 8/2014 | Lee |
| 2015/0086824 A1 | 3/2015 | Burga et al. |

FOREIGN PATENT DOCUMENTS

| | | | | |
|---|---|---|---|---|
| GB | 2386098 A | * | 9/2003 | ................ B41J 5/12 |
| WO | 2014/082867 A1 | | 6/2014 | |

OTHER PUBLICATIONS

[NPL-2] "periodic" defininition according to Dictionary.com; <https://www.dictionary.com/browse/periodic?s=t>. (Year: 2019).*
Search Report dated Nov. 18, 2016 EP 16 18 9841.

* cited by examiner

BONDING ARRANGEMENT AND PRODUCTION METHOD

FIELD OF THE INVENTION

The invention relates to a bonding arrangement for the assembly of structures, the structures comprising at least one substrate member to which at least one coating structure is applied, the substrate member and the coating structure comprising a common interface which forms at least one bond, the at least one bond being designed as an adhesive bond. The invention also relates to a method of providing such a bonding arrangement for use in an aircraft or spacecraft, as well as to a vehicle, particularly an aircraft or a spacecraft, that incorporates one or more devices comprising an assembled structure with such a bonding arrangement.

BACKGROUND OF THE INVENTION

The handling of composite materials comprising polymer matrix composites as fiber-reinforced plastics often raises the question how to join composite structures with other materials as, for example, certain metals or themselves. To join composites or mixed materials, mechanical attachments may be used with the different surfaces.

State of the art bonding uses small test specimens produced in the same cycle, with the same materials and by the same operators in order to verify the quality of the bond. This technique is aimed at guaranteeing the strength of the bond.

Unfortunately, non-destructive testing (NDT) of bond strength is very expensive and time consuming.

BRIEF SUMMARY OF THE INVENTION

It is therefore an idea of the present invention to provide a new and improved bonding arrangement, especially for use in an aircraft or spacecraft. It would be particularly desirable to provide a bonding arrangement that is designed or configured to or create a bond design which is incapable of locally loading the adhesive above the peel strength.

According to one aspect, therefore, the invention provides a bonding arrangement according to the introducing explanations, in which particularly the coating structure is split into a plurality of neighboring structural elements spatially separated from each other, and whereby at least one supporting member is provided, which comprises a plurality of recesses receiving the structural elements in operating position. Thus, as the structural elements of the coating structure are separated from each other, a load exerted on the arrangement in Mode I is spread over the individual structural elements. Accordingly, the invention provides a load sharing arrangement which is incapable of locally loading the adhesive above the peel strength. This effectively removes the weak peeling mode failure from adhesive bonds.

In an embodiment of the present invention, the supporting member covers the surfaces of the structural elements facing the recesses thus ensuring a plane reception of the individual structural elements. In a further embodiment, the supporting member forms a sort of a bracket surrounding each of the neighboring structural elements of the coating structure at least in part. Accordingly, the individual structural elements form a kind of "islands" and are covered by a female bracket which has a form fit to the elements. The islands can be installed in the bracket before application to the surface to ensure placement accuracy. An adhesive can be applied to the islands or an appropriately shaped adhesive film. The bond of the supporting member together with the structural elements received in the recesses, the recesses surrounding the structural elements as a form of a female bracket forms itself a kind of a pad.

In another advantageous embodiment of the present invention, the supporting member and the neighboring structural elements of the coating structure are connected indirectly to enhance the supporting capabilities of the supporting member. A further embodiment may therefore comprise an intermediate layer, which is arranged between the supporting member and the neighboring structural elements of the coating structure and which particularly provides the mechanical properties of a spring between the supporting member and the respective neighboring structural element.

As seen before, the islands formed by the neighboring structural elements are not connected directly to the female bracket of the supporting member. There is an intermediate layer which acts as a spring. In another embodiment of the present invention the spring formed by the intermediate layer may show an asymptotic load vs. displacement loading behavior, which means the faster the material reaches the asymptote the more sensitive the load sharing is and consequently the lower are the displacements allowed.

Due to the characteristics of the material under load, the load on a single structural element, forming one of the mentioned islands, cannot increase above a predetermined level. Due to this characteristic the load is spread around all the other "islands" which are not at maximum load carrying capability. This ensures maximum uniform load distribution before failure.

The spring (layer) is bonded to the female bracket of the supporting member and to the respective "island". The thickness of the spring layer, the "islands" and adhesives should be minimized to reduce secondary bending.

In a further embodiment, the material of the intermediate layer may comprise an anisotropic lattice material, which material is especially formed by foam, a super-elastic polymer or a multi-material combination, in each case showing asymptotic spring loading behavior. The respective spring can be manufactured, for example, using additive manufacturing for an anisotropic lattice In other embodiments the material is formed by at least one elastomeric foam, a super-elastic alloy and/or a shape memory alloy, for example a copper-aluminium-nickel (Cu—Al—Ni) alloy, a Nitinol shape memory alloy or a super-elastic polyisoprene-based polymer. Furthermore, it is conceivable that the intermediate layer is formed by any material, which exhibits asymptotic spring loading behavior.

To ensure a regular and accurate coating of the substrate member and a uniform load distribution in case of Mode I loading if the bonding arrangement, in a further embodiment of the present invention the plurality of first structural elements comprises a regular structure, particularly a periodic structure and/or wherein the periodic structure of the first structural elements forming the mentioned islands is designed such, that the perimeter of the structure is minimized. Therefore, the islands may be formed as hexagons.

In further embodiment of the present invention, having an improved stability between the arrangement members, there is an adhesive means arranged between at least one of the contacting surfaces of the structural elements, the intermediate layer, and the supporting member.

According to another aspect, the disclosure provides a method of forming a bonding arrangement, with at least one substrate member and one coating structure to be assembled, both comprising a common interface which forms at least one bond, comprising the steps of:

providing a coating structure and subdividing the coating structure into a plurality of neighboring structural elements spatially separated from each other;

providing a supporting member with recesses which are designed to receive the neighboring structural elements;

providing an intermediate layer showing spring properties and securing the layer with its elements in recesses of the supporting member;

securing the plurality of neighboring structural elements in the recesses of the supporting member;

preparing surfaces of all parts;

applying at least one adhesive to the neighboring structural elements.

In one embodiment, the method according to the present invention further comprises the step of attaching the bonding arrangement to the substrate being the desired surface to fasten the coating structure to the substrate to be covered and/or subsequently followed by a curing step to safely cure the assembly.

To facilitate the production of bonding arrangements the structural elements of the coating structure and/or the supporting member made available in the production process, according to still another embodiment of the present invention, are advantageously provided using a selective laser melting process or a selective laser sintering process.

According to still another aspect, the present disclosure also provides a vehicle, such as an aircraft or spacecraft, which includes at least one bonding arrangement according to any one of the embodiments of the disclosure described above.

BRIEF DESCRIPTION OF THE DRAWINGS

For a more complete understanding of the invention and the advantages thereof, exemplary embodiments of the invention are explained in more detail in the following description with reference to the accompanying drawings, in which like reference characters designate like parts and in which.

The accompanying drawings are included to provide a further understanding of the present disclosure and are incorporated in and constitute a part of this specification. The drawings illustrate particular embodiments of the invention and together with the description serve to explain the principles of the invention. Other embodiments of the invention and many of the attendant advantages of the invention will be readily appreciated as they become better understood with reference to the following detailed description.

DETAILED DESCRIPTION

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as is accorded to such terms and expressions with respect to their corresponding respective areas of inquiry and study, except where specific meanings have otherwise been set forth herein.

Figure 1:
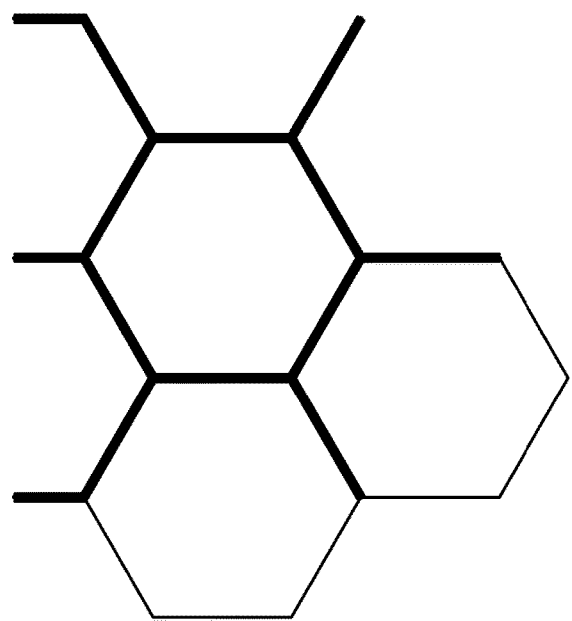
FIG. 1 is a schematic illustration of a plane view of individual structural elements of a coating structure received in recesses of a supporting member according to embodiments of the disclosure.

With reference firstly to FIG. 1 of the drawings, a general structure providing the load sharing concept of a bond arrangement in whole referenced with 10 is illustrated. A plurality of individual structural elements 22 of a coating structure 20 is shown, the structural elements 22 are formed as hexagonal "islands." The structural elements 22 are received in recesses 32 of a supporting member 30 according to embodiments of the disclosure. One can identify the tiling of the neighboring structural elements 22 as individual hexagonal "islands" which are covered by the recesses each forming a kind of a female bracket which has a form fit to the hexagons. The islands (structural elements 22) can be installed in the bracket before application to the surface of the substrate 50 to ensure placement accuracy. An adhesive (not shown in FIG. 1) can be applied to the structural elements 22 or a hexagonally shaped adhesive film (neither shown).

Figure 2:
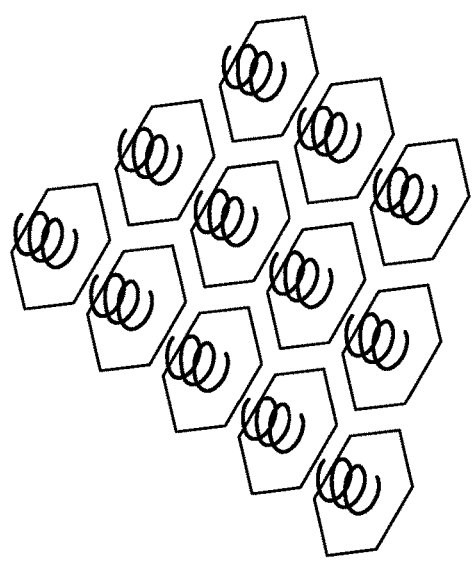
FIG. 2 is a schematic perspective view of a plurality of neighboring structural elements each comprising a symbolic spring element illustrating the redundancy of the load sharing of the bonding arrangement according to embodiments of the disclosure.

Referring now to FIG. 2 of the drawings, a schematic perspective view of a somewhat arbitrarily chosen plurality of neighboring structural elements 22 of the coating structure 20 is shown, the structural elements 22 each comprising a symbolic spring element 42 illustrating the redundancy of the load sharing of the bonding arrangement according to embodiments of the disclosure. The hexagonal islands representing the structural elements 22 are not connected directly to the associated female bracket of the respective recesses as there is an intermediate layer 40 which acts as a spring (spring element 42). Due to the characteristics of the material under load, the load on a single, pad-like structural element 22 cannot increase above a predetermined level. Due to this characteristic the load is spread around over all the other "islands" which are not at maximum load carrying capability. This ensures maximum uniform load distribution before failure.

Figure 3:
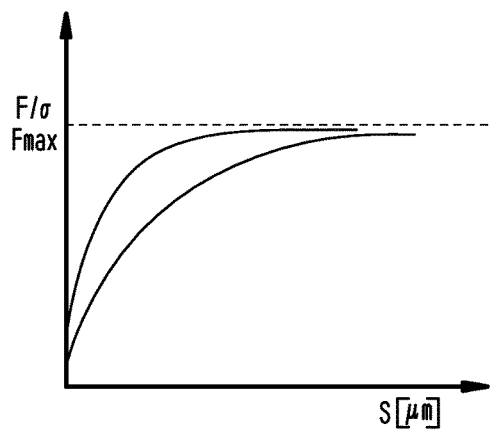
FIG. 3 schematically illustrates the asymptotic load vs. displacement loading behavior of the intermediate layer acting as a spring according to an embodiment of the disclosure by graphic representation.

The spring element 42 of the intermediate layer 40 has asymptotic load vs displacement loading behavior, which can be learned best from the graphic representation of FIG. 3 of the drawings. In the graph there is drawn this behavior with two curves comprising different velocities in converging towards a maximum load value $F_{max}$. The asymptotic behavior of the intermediate layer material ensures that the peel strength will not be exceeded. Furthermore, the faster the material reaches the asymptotic value of $F_{max}$, the more sensitive the load sharing of the bonding arrangement 10 is (lower allowable displacements).

Referring now to FIG. 3 of the drawings, an example of schematically illustrates the asymptotic load vs. displacement loading behavior of the intermediate layer acting as a spring according to an embodiment of the disclosure by graphic representation with two curves approaching a maximum value of load F with increasing displacement δ in an asymptotic manner.

Figure 4:
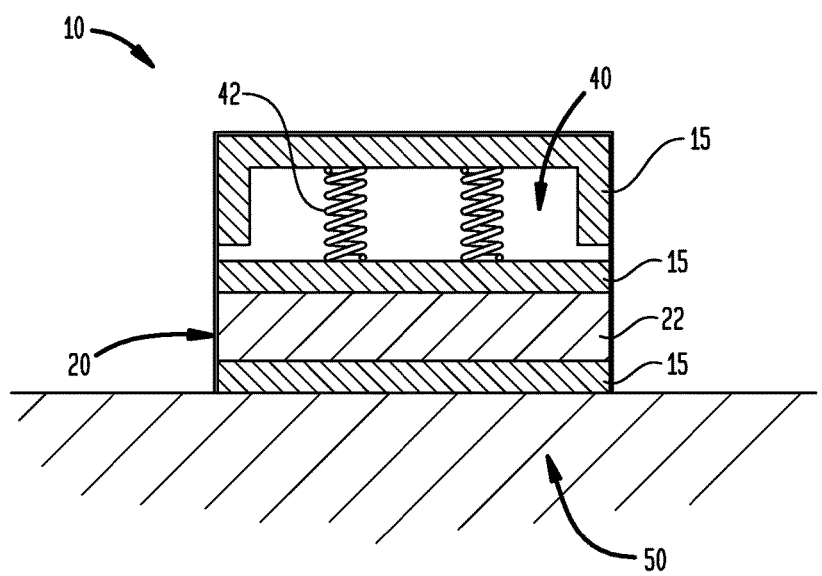
FIG. 4 is a schematic lateral view illustration of the bonding arrangement according to embodiments of the disclosure with the substrate with applied coating structure subdivided into neighboring structural elements and the supporting member provided with several adhesive means.
Figure 5:
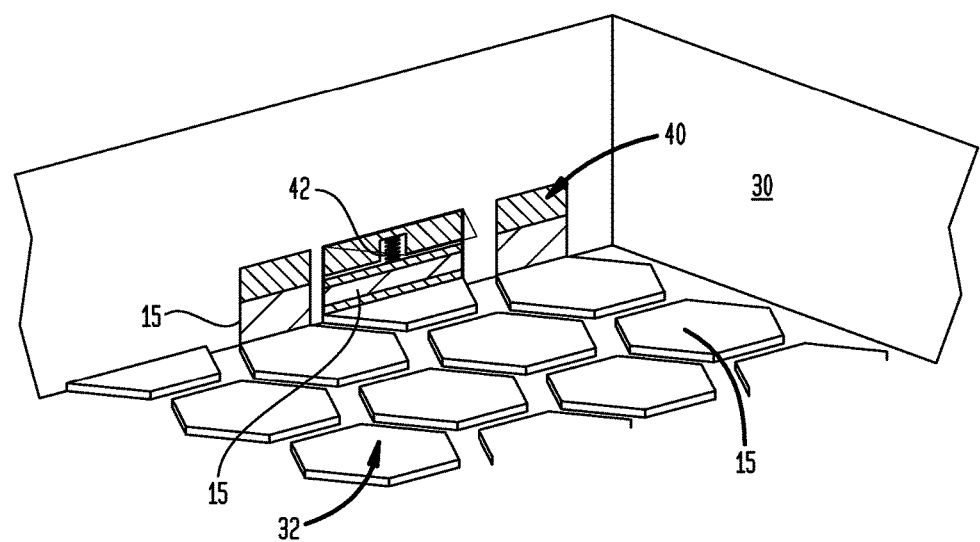
FIG. 5 is a schematic perspective sectional view from the bottom illustrating the supporting member with installed intermediate layer and the recesses ready to receive the individual structural members of the coating structure according to embodiments of the disclosure.

Now turning to FIGS. 4 and 5, it is initially shown a schematic lateral view illustration of the bonding arrangement 10 according to embodiments of the disclosure with the substrate 50 with applied coating structure 20 subdivided into neighboring structural elements 22 and the supporting member 30 provided with several adhesive means 15 in FIG. 4. At the bottom of FIG. 4, one finds a substrate 50 of the bonding arrangement 10 of the present disclosure equipped with a coating structure 20. The coating structure 20 covers an area of the substrate 50 and is subdivided into hexagonal structural elements 22. The structural elements 22 themselves are received in recesses 32 of a supporting member 30, the recesses 32 forming female brackets for the island-like structural elements 22. Between the coating structure 20 with the structural elements 22 and the supporting member 30 with its recesses 32 there is arranged an intermediate layer 40 acting as a spring represented by spring elements 42 arranged in the recesses 32. Furthermore, there are adhesives 15 provided between the supporting member 30 and the structural elements 22 as well as between the structural elements 22 and the substrate 50 to create a tough bonding arrangement 10. FIG. 4 shows the adhesive means 15 in the form of a film arranged both between the intermediate layer 40 and the structural elements 22 of the coating structure 20 and between the structural elements 22 and the substrate 50. FIG. 5 illustrates an arrangement of the adhesive means 15 on the side of the intermediate layer 40 facing the substrate 50 (not shown in FIG. 5).

The supporting member 30 is shown in greater detail in the schematic perspective sectional view of FIG. 5, where the supporting member 30 is illustrated from the bottom with an installed intermediate layer 40 and the recesses 32 ready to receive the individual structural members 22 of the coating structure 20 according to embodiments of the disclosure. To simplify matters and to clarify one of the concepts of the present invention, the intermediate layer 40 is illustrated with a layer structure 41 as well as a spring element 42 making clear its mechanical properties. Moreover, the hexagonal shape of the recesses 32 reflecting as well the shape of the structural elements 22 (not shown here for sake of clarity) is clearly demonstrated in FIG. 5.

To conclude, according to the above explanations a bonding arrangement 10 for the assembly of structures is disclosed, the structures comprising at least one substrate member 50 to which at least one coating structure 20 is applied, the substrate member 50 and the coating structure 20 comprising a common interface which forms at least one bond, the at least one bond being designed as an adhesive bond. The coating structure 20 is split into a plurality of neighboring structural elements 22 spatially separated from each other, and at least one supporting member 30 is provided, which comprises a plurality of recesses 32 receiving the structural elements 22 in operating position.

Thus, with the present disclosure a structural design concept is provided, which uniformly spreads all peel loads due to asymptotic spring-displacement behavior of an intermediate interface. This gives the opportunity to remove Mode I failure from bonded joints. Consequently, local bonding defects (weak bonds) have a decreasing impact on bond strength as the number of islands (structural elements 22) goes up leading to negligible influence at high number of islands, in other words, a higher degree of redundancy is provided.

Although specific embodiments of the invention have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their object.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A bonding arrangement for the assembly of structures, the structures comprising at least one substrate member to which at least one coating structure is applied, the substrate member and the coating structure comprising a common interface which forms at least one bond, the at least one bond being configured as an adhesive bond, wherein the coating structure is split into a plurality of neighboring structural elements spatially separated from each other, and wherein at least one supporting member is provided, which comprises a plurality of recesses receiving the structural elements in operating position, wherein an intermediate layer is arranged between the supporting member and the neighboring structural elements of the coating structure,
wherein the intermediate layer provides the mechanical properties of a spring between the supporting member and the respective neighboring structural element, and
wherein the intermediate layer having the mechanical properties of a spring shows an asymptotic load vs. displacement loading behavior.

2. The bonding arrangement of claim 1, wherein the at least one supporting member covers the surfaces of the neighboring structural elements facing the recesses.

3. The bonding arrangement of claim 1, wherein the at least one supporting member forms a bracket surrounding each of the neighboring structural elements of the coating structure at least in part.

4. The bonding arrangement of claim 1, wherein the supporting member and the neighboring structural elements of the coating structure are connected indirectly.

5. The bonding arrangement of claim 1, wherein the intermediate layer comprises an anisotropic lattice material.

6. The bonding arrangement of claim 5, wherein the lattice material is formed by at least one of a foam, a super-elastic polymer and a multi-material combination, each showing asymptotic spring loading behavior.

7. The bonding arrangement of claim 5, wherein the anisotropic lattice material is formed by at least one of at least one elastomeric foam, by a super-elastic alloy and a shape memory alloy.

8. The bonding arrangement of claim 7, wherein the shape memory alloy comprises at least one of a copper-aluminium-nickel alloy, a Nitinol shape memory alloy and a super-elastic polyisoprene-based polymer.

9. The bonding arrangement of claim 1, wherein the plurality of neighboring structural elements comprises a regular structure.

10. A bonding arrangement for the assembly of structures, the structures comprising at least one substrate member to which at least one coating structure is applied, the substrate member and the coating structure comprising a common interface which forms at least one bond, the at least one bond being configured as an adhesive bond, wherein the coating structure is split into a plurality of neighboring structural elements spatially separated from each other, and wherein at least one supporting member is provided, which comprises a plurality of recesses receiving the structural elements in operating position,
wherein an intermediate layer is arranged between the supporting member and the neighboring structural elements of the coating structure, and
wherein between contacting surfaces of at least two of the structural elements, the intermediate layer, and the supporting member an adhesive means is arranged.

11. The bonding arrangement of claim 10, wherein the intermediate layer provides the mechanical properties of a spring between the supporting member and the respective neighboring structural element.

12. The bonding arrangement of claim 11, wherein the intermediate layer having the mechanical properties of a spring shows an asymptotic load vs. displacement loading behavior.

13. A vehicle provided with at least one device comprising an assembled structure with a bonding arrangement, the structure comprising at least one substrate member to which at least one coating structure is applied, the substrate member and the coating structure comprising a common interface which forms at least one bond, the at least one bond being configured as an adhesive bond, wherein the coating structure is split into a plurality of neighboring structural elements spatially separated from each other, and wherein at least one supporting member is provided, which comprises a plurality of recesses receiving the structural elements in operating position.

14. A bonding arrangement for the assembly of structures, the structures comprising at least one substrate member to which at least one coating structure is applied, the substrate member and the coating structure comprising a common interface which forms at least one bond, the at least one bond being configured as an adhesive bond, wherein the coating structure is split into a plurality of neighboring structural elements spatially separated from each other, and wherein at least one supporting member is provided, which comprises a plurality of recesses receiving the structural elements in operating position,
wherein an intermediate layer is arranged between the supporting member and the neighboring structural elements of the coating structure, and
wherein the intermediate layer comprises an anisotropic lattice material.

15. The bonding arrangement of claim 14, wherein the lattice material is formed by at least one of a foam, a super-elastic polymer and a multi-material combination, each showing asymptotic spring loading behavior.

16. The bonding arrangement of claim 14, wherein the anisotropic lattice material is formed by at least one of at least one elastomeric foam, by a super-elastic alloy and a shape memory alloy.

17. The bonding arrangement of claim 16, wherein the shape memory alloy comprises at least one of a copper-aluminium-nickel alloy, a Nitinol shape memory alloy and a super-elastic polyisoprene-based polymer.

18. The bonding arrangement of claim 14, wherein the at least one supporting member covers the surfaces of the neighboring structural elements facing the recesses.

19. The bonding arrangement of claim 14, wherein the at least one supporting member forms a bracket surrounding each of the neighboring structural elements of the coating structure at least in part.

20. The bonding arrangement of claim 14, wherein the supporting member and the neighboring structural elements of the coating structure are connected indirectly.

* * * * *